Patented Oct. 28, 1947

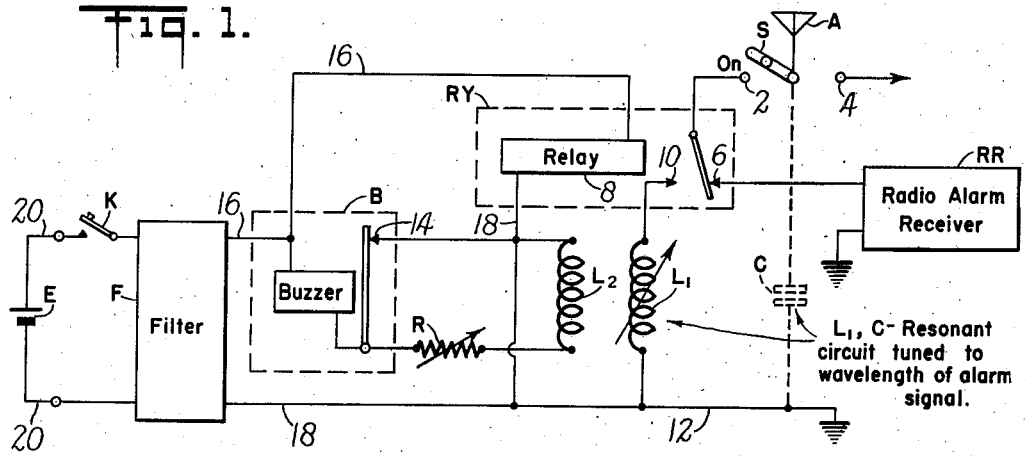
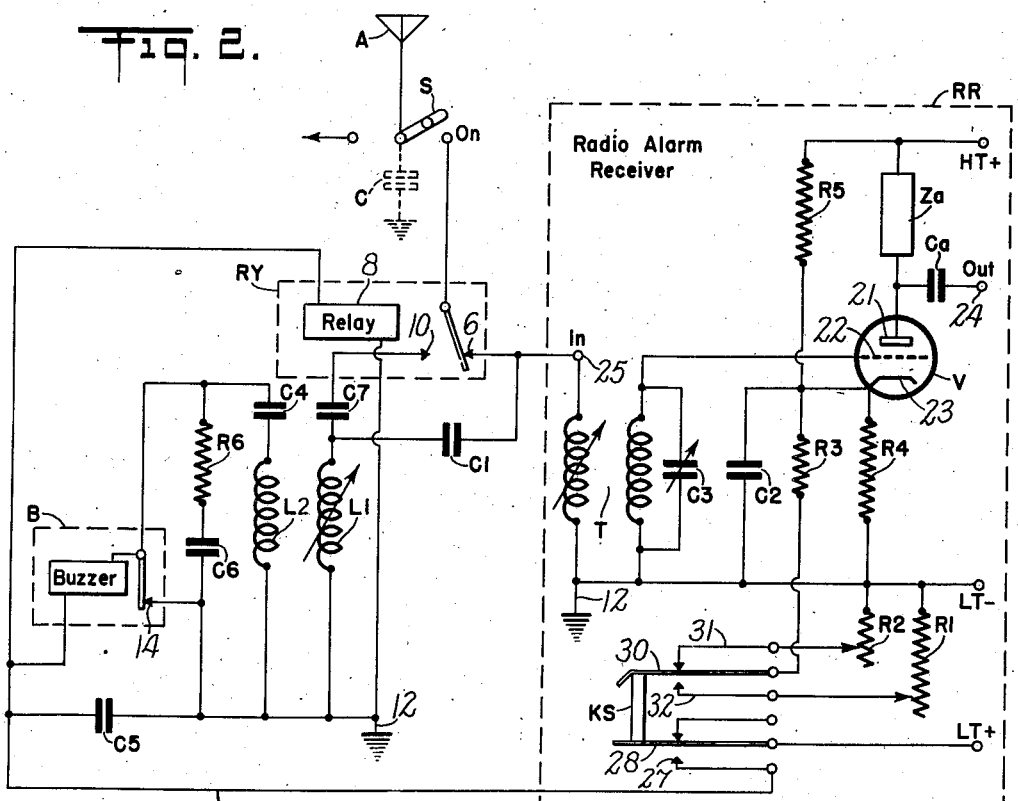

2,429,624

UNITED STATES PATENT OFFICE 2,429,624

TESTING APPARATUS FOR RADIO ALARM SYSTEMS

John Douglas Holland and Duncan Dove Robinson, London W. C. 2, England, assignors, by mesne assignments, to International Standard Electric Corporation, New York, N. Y., a corporation of Delaware Application February 13, 1943, Serial No. 475,740
In Great Britain March 27, 1942

12 Claims. (Cl. 250—20)

The present invention relates to automatic alarm arrangements used on ships and in particular concerns means for testing such arrangements.

It is common practice for ships to carry automatic radio alarm receivers to enable them to receive S O S or other alarm signals without the necessity for the continued presence of an operator. When the operator goes off duty he will generally switch on the automatic alarm, but he may forget to see that the aerial switches in the cabin are in the right position. Thus, it may be that although the radio receiver is in proper working order, the alarm cannot be received because the aerial is not connected. It is essential, therefore, to have a simple test which will show not only whether the receiver is properly adjusted but also whether the aerial is connected. A test which has been used in the past has been to put a buzzer signal into the receiver, from which it is easily possible to determine whether this receiver is operating, but this does not give any information about the aerial. It would, of course, be possible to interlock the aerial change-over switch with the test arrangements, but this would not take care of some failure in the aerial system itself, and moreover, more than one aerial switch might be involved.

The present invention provides an equally simple test which, however, also takes account of the aerial and gives an indication as to whether the whole of the receiving system is in proper condition to receive the alarm signal.

According to the invention there is provided a radio alarm system comprising an aerial, a radio receiver adapted to be tuned to the alarm wavelength, means for switching the aerial from the receiver to a variable inductance to form therewith a resonant circuit tuned to the said wavelength, and means to excite the resonant circuit to cause it to generate waves adapted to be detected by the receiver.

The invention will be more clearly understood from the following detailed description with reference to the accompanying drawings, Figs. 1 and 2 of which show schematic circuit diagrams of two embodiments.

Referring to Figure 1, the aerial A is connected to a switch S by means of which it may be connected through a contact 4 to earth or to a radio receiver not shown, or when switch S is in the "on" position, the aerial may be connected through a contact 2 through a change-over relay RY to a radio receiver RR. The connection to receiver RR is through a contact 6, and the relay has an operating coil 8 which is energized to move the contact arm of the relay from the normal position shown away from contact 6 and against a contact 10. Contact 10 is connected to one side of a variable inductance L1 the other side of which is is connected to an earth circuit 12. The capacity between aerial 6 and earth is indicated in broken lines by an equivalent capacity C in parallel with inductance L1, and the value of inductance L1 is adjusted so that it forms with the capacity a tuned circuit which resonates at the wave length of the alarm signal. Thus, assuming that switch S is in the "on" position, the energization of relay RY disconnects the aerial from receiver RR and connects it to inductance L1 to produce the resonant circuit. A second inductance L2 is coupled to inductance L1 and is included in a circuit comprising an adjustable resistance R and a contact 14 of a buzzer B. Buzzer B and relay RY are connected in parallel through conductors 16 and 18, a low-pass filter F, and leads 20 to a battery E, there being a key K which is closed to simultaneously operate the buzzer and energize coil 8 of the relay. Filter F prevents buzzer modulated signals from being radiated from the battery-supply leads 20 to the remainder of the circuit.

When the key K is closed, the relay RY will be operated to switch the aerial A from the radio receiver RR to the inductance L1 and at the same time the buzzer will be started and will periodically interrupt the circuit containing the resistance R and the inductance L2. This will excite the tuned circuit L1, C and waves will be radiated at the wavelength of the alarm signal with sufficient intensity to be picked up by the radio receiver, which should, of course, be tuned to that wavelength. The resistance R is provided to adjust the degree of excitation of the tuned circuit. It will be evident that if the aerial should be disconnected at the switch S, the condenser C will be removed from the tuned circuit which will, therefore, generate oscillations at some frequency much higher than that to which the receiver is tuned. The fault will be immediately evident because nothing will be detected by the receiver. A similar result will be obtained if there is some fault in the aerial system which affects the value of the capacity C, in which case if oscillations are generated, the wave length will be altered. Likewise, if the aerial should be properly connected and if the receiver should be defective or wrongly tuned, again no buzzer signals will be obtained.

Thus, when the test is made, a satisfactory indication will only be obtained if the whole of the receiving system including the aerial is in proper condition to receive the alarm signals. All that the operator has to do on going off duty is to depress key K and if he gets the proper indication in the receiver RR he will be assured that the arrangements are in order.

It will be clear that if desired, the various elements shown in the accompanying figure can be included inside the radio receiver, proper screening means being of course provided, it being understood that the screening means does not interfere with the radio receiver picking up the signals as explained above.

The switch S has been shown to represent any switch or system of switches which may be connected with the aerial, and which must be set in a particular way in order that the alarm may be picked up.

Fig. 1 shows the essentials of the invention, but certain other details are desirable to make a practical arrangement.

It is found in some cases, that in order to receive the alarm signals, the sensitivity of the receiver has to be so high as to be overloaded by the test signals, so that no very distinctive difference is noticeable in the signals received, if the aerial is connected to the auxiliary circuit, or not; and, moreover, the receiver may also be undesirably sensitive to noise picked up on the aerial connecting leads.

Fig. 2 shows substantially the same arrangement as Fig. 1, with the addition of the means for overcoming the difficulties mentioned.

The dotted outline RR represents the alarm receiver of which only the first stage is shown, comprising a suitable valve V, preferably of the variable gain type.

The anode 21 of the valve V is polarised from a high tension supply at terminal HT+ through a suitable anode impedance $Z_a$, the amplified signals being taken from the anode 21 through a blocking condenser $C_a$, and supplied to the rest of the receiver (not shown) which is connected to the "out" terminal 24. A potentiometer comprising resistances $R_5$, $R_3$ and $R_2$ is connected across the high tension supply for the purpose of biasing suitably the cathode 23 of the valve, the usual by-pass condenser $C_2$ being provided. Resistance $R_2$ is connected to resistance $R_3$ through a contact arm 30 of a keying switch KS hereinafter to be described. Input signals are supplied from the aerial A to the control grid 22 of the valve V through the "in" terminal 25 and through an input transformer T tuned by a condenser $C_3$ to the wave length of the alarm signal.

The circuit of the buzzer B in Figure 2 is substantially the same as that of Figure 1, but resistance R in Figure 1 is replaced by a condenser $C_4$ connected in series with $L_2$ across the buzzer contact 14, and this contact is shunted by a spark-quenching circuit formed by a condenser $C_6$ and a resistor $R_6$. A condenser $C_5$ represents the filter F of Figure 1, and the buzzer B and relay RY are operated from the cathode-heating source for the radio receiver. This is a low-tension circuit source connected as shown at the lower right-hand portion of the figure to terminals LT+ and LT−. The connection from LT− is through the earth circuit 12 to one side of buzzer B and relay RY, and the connection from LT+ is through a contact arm 28 of keying switch KS to a contact 27 and thence through a conductor 26 to the other side of buzzer B and relay RY.

Instead of relying on radiation to transfer the waves to the receiver, it is preferred to shunt the contacts of the relay RY with a condenser $C_1$ which conveys the waves directly thereto, and to connect the condenser $C_7$ in series with relay contact 10 as shown. The condenser $C_7$ forms with the capacity of the aerial A, i. e., the condenser C, a reducing potentiometer by which the buzzer signal voltage applied to the aerial during the test may be reduced to a value such that the radiation of the test signals from the aerial is negligible, or within some allowable limit.

The condenser $C_7$ has the further advantage of extending the effective tuning range of the inductance $L_1$, because being small compared with C, it has the effect of reducing the capacity variations of different aerials as seen from the inductance $L_1$.

When the operator goes off duty and wishes to ascertain whether the aerial and receiver are in proper order to receive an alarm signal, he depresses the key KS. This connects relay RY and buzzer B to the low-tension supply terminal LT+ through contact 27 and contact arm 28 so that aerial A is connected to the test apparatus and buzzer B is started, and in addition the closing of switch KS moves contact arm 30 away from contact 31 and against contact 32. The moving of contact arm 30 away from contact 31 removes adjustable resistance $R_2$ from the circuit and substitutes therefor an adjustable resistance $R_1$, thus, changing the bias on cathode 23 of valve V.

The resistance $R_2$ should be adjusted so that the sensitivity of the receiver is suitable for the alarm signal to be received. The resistance $R_1$ is however preferably adjusted so that disturbances derived from the buzzer contacts (and otherwise) just would not operate the receiver when the aerial is disconnected. These disturbances cannot be entirely removed by the spark quenching arrangements and have been found to be very troublesome in the past. The waves due to the excitation of the tuned circuit when the aerial is normally connected are at a much higher level than these disturbances and the circuit can be adjusted (for example by suitably choosing $C_4$) so that these waves will operate the receiver, with plenty of margin when $R_1$ has been adjusted in the manner described.

The resistances $R_1$, $R_2$ and $R_3$ may be of the order of a few hundred ohms, while $R_5$ may be perhaps 10,000 to 100,000 ohms, according to the potential of the high tension battery, and the bias required for the cathode. A resistance $R_4$ of high value (perhaps ¼ megohm) is provided to shunt the cathode independently of the key KS, for the purpose of blocking the valve during the operation of the key, so that during the period when all the contacts are open, the cathode potential is raised to a high value.

The reason for this is that while the aerial is being tested it will in general be picking up signals and/or noise which will occupy the dot periods of the S O S signal which the operator uses to test the arrangement. Unless a short interval of no signal is definitely provided, the relays etc. in the part of the receiver not shown may not properly release because of the general noise which may fill up the dot periods. By blocking the valve for an instant at the beginning and end of each dot period, during the change-over of the key, the necessary no signal period is ensured.

It will be understood that various other ways of changing the sensitivity of the receiver could be used, not necessarily involving a variable gain valve. Moreover, other arrangements of resistances or other biasing means could be employed.

Neither of the resistances R4 or R5 is essential to the invention, though their use is desirable.

The key K can be any suitable switch or relay, but it is preferable that it should not be capable of locking in the operated position so that it cannot be left accidentally in that position.

What is claimed is:

1. A radio alarm system comprising an aerial, a radio receiver arranged to be tuned to an alarm wavelength, a variable inductance discrete from said receiver and adjusted to a value which, when shunted by the aerial-ground capacity will form a circuit resonant to said alarm wavelength, means for switching said aerial from said receiver to said variable inductance to form therewith said resonant circuit tuned to said wavelength, and means to excite said resonant circuit to cause it to generate waves adapted to be detected by said receiver, said receiver including a thermionic valve of the variable gain type and means to change the cathode bias of said valve in response to operation of said switching means to enable said receiver to receive satisfactorily the waves generated by said resonant circuit.

2. A radio system as described in claim 11, wherein said local signal source is energized simultaneously with the operation of said connection means.

3. A radio system as described in claim 11, wherein means is provided in said receiver to adjust the receiver for the proper reception of the signal from the local signal source.

4. A radio system as described in claim 11, wherein means is provided in said receiver to adjust the receiver to correspond with the anticipated magnitude of the signal from said local signal source, and means to operate simultaneously said last named means and said connection means and said local signal source.

5. A radio system as described in claim 11, wherein said receiver includes a thermionic valve of the variable gain type, and means to change the cathode bias of said valve simultaneously with the operation of said connection means whereby the receiver is adjusted in accordance with the anticipated magnitude of the signal from said local signal source.

6. A radio system as described in claim 11, wherein said receiver includes a thermionic valve of the variable gain type, means to change the cathode bias of said valve simultaneously with the operation of said connection means whereby the receiver is adjusted in accordance with the anticipated magnitude of the signal to be received, and means to impose a blocking bias on the cathode during the time that said last-named means is changing the cathode bias.

7. A radio system as described in claim 11, wherein a condenser is provided connecting said tuned circuit to said receiver thereby to provide a direct connection for the test signals.

8. A radio system as described in claim 11, wherein said local signal source is a buzzer and circuit means coupled to said tuned circuit.

9. A radio system as described in claim 11, wherein said local signal source is a buzzer and said means to operate said connection means is the solenoid of a relay connected in parallel with said buzzer, and filter means to prevent the signals from being radiated through the power supply means.

10. In a radio system, the combination of, an aerial, switch means connected to said aerial and having a first position and a second position, a radio receiver which is tunable to the wave length of an alarm signal and which is connected to said aerial when said switch means is in said first position, electrical circuit means which is connected to said aerial when said switch means is in said second position, said electrical circuit means forming with said aerial a tuned circuit resonant to the wave length of said alarm signal, a local source of signals connected to said electrical circuit means to produce oscillations in said tuned circuit at the wave length of said alarm signal, and means to operate said switch means from said first position to said second position whereby said aerial is disconnected from said receiver and is connected to said electrical circuit means with the result that said local signal source cooperates with the resonant circuit formed by said electrical circuit means and said aerial to produce a signal of the wave length of said alarm signal and of sufficient intensity to be picked up by said receiver if said receiver is tuned to the wave length of the alarm signal, whereby the receipt of such signal by said receiver indicates that the entire radio alarm system is in proper operating condition.

11. In a radio system, the combination of, an aerial, connection means connected to said aerial and adapted to connect said aerial alternatively to a first connection or to a second connection, a radio receiver which is tunable to the wave length of an alarm signal and which is connected to said first connection whereby it may be connected by said connection means to said aerial, electrical circuit means connected to said second connection whereby it may be connected to said aerial by said connection means, said electrical circuit means forming with said aerial a tuned circuit resonant to the wave length of said alarm signal, a local source of signals connected to said electrical circuit means to produce oscillations in said tuned circuit at the wave length of said alarm signal, and means to operate said connection means whereby said aerial is disconnected from said first connection and is connected to said second connection with the result that said local source of signals cooperates with the tuned circuit formed by said electrical circuit means and said aerial to produce a test signal of the wave length of said alarm signal and of sufficient intensity to be picked up by said receiver if said receiver is tuned to the wave length of said alarm signal, whereby the receipt of such test signal by said receiver indicates that the entire radio system including the aerial is in proper operating condition.

12. In a radio alarm installation including a radio receiver adapted to be connected to an aerial and tunable to the wave length of an alarm signal, apparatus for testing the operability of the installation including the aerial comprising, in combination, circuit means which when connected to said aerial forms therewith a tuned circuit resonant to the wave length of said alarm signal, a local source of signals coupled to said tuned circuit and adapted to produce oscillations in the tuned circuit at the wave length of said alarm signal, connecting means for connecting the aerial alternatively to the radio receiver or said circuit means, and means for operating said connecting means and said local source of signals whereby said tuned circuit is set up and a test signal is produced of the wave length of said alarm signal and of sufficient intensity to be picked up by said radio receiver if said radio receiver is tuned to the wave length of the alarm signal.

JOHN DOUGLAS HOLLAND.
DUNCAN DOVE ROBINSON.

REFERENCES CITED

The following references are of record in the file of this patent:

UNITED STATES PATENTS

| Number | Name | Date |
|---|---|---|
| 2,262,956 | Newbold | Nov. 18, 1941 |
| 2,289,147 | Shea | July 7, 1942 |
| 1,923,430 | Fanning | Aug. 22, 1933 |